Aug. 20, 1935.  A. KIDD  2,011,719
ARC WELDING METHOD
Filed Oct. 20, 1932
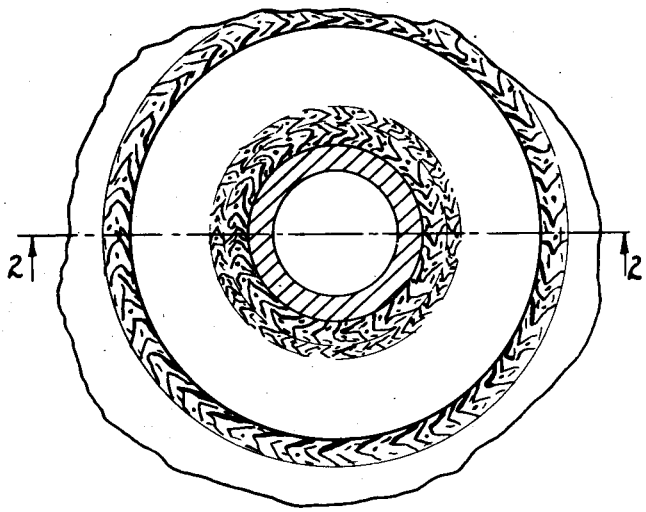
Fig-1
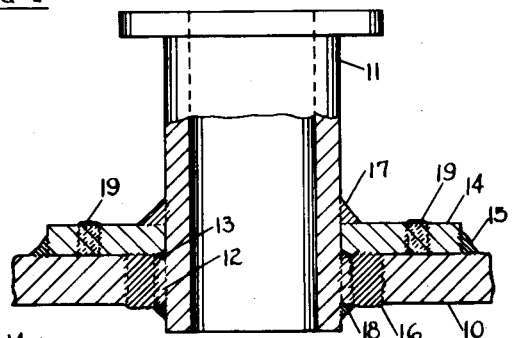
Fig.-3
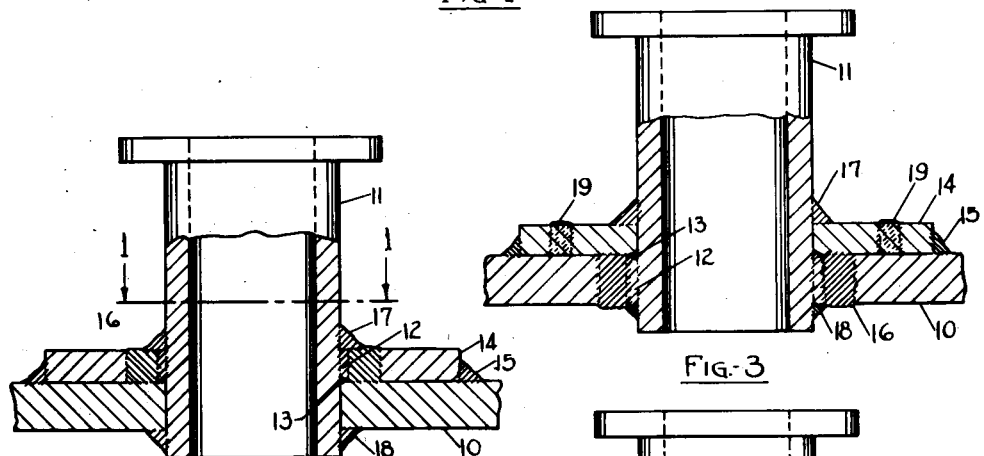
Fig.-2
Fig.-4
Fig.-5
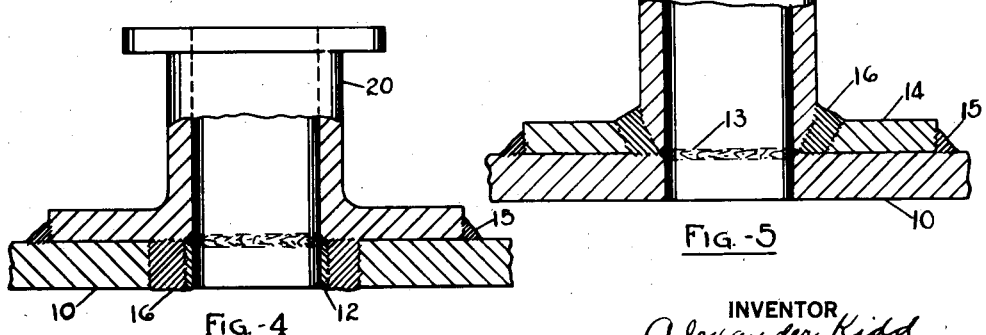
INVENTOR
Alexander Kidd
BY
Virgil F. Davico
ATTORNEY Patented Aug. 20, 1935

2,011,719

UNITED STATES PATENT OFFICE 2,011,719

ARC WELDING METHOD

Alexander Kidd, Hawthorne, N. J., assignor to M. W. Kellogg Co., New York, N. Y., a corporation of Delaware Application October 20, 1932, Serial No. 638,665

8 Claims. (Cl. 219—10)

This invention relates in general to the fabrication of metallic vessels by electric welding and in particular to the electric welding of reinforcing plates, tubular connectors, flanges and the like to the walls of said vessels.

When the wall of a vessel designed to withstand pressure is perforated to provide a handhole or man-hole, or a hole for joining to the vessel wall a nozzle or other tubular connector, it is generally necessary to reinforce the vessel wall in the region of the hole in order to compensate for the metal removed. Since the stresses transmitted from the vessel wall to the reinforcing member are shearing stresses, the weld connecting the vessel wall and the reinforcing member must be of a width sufficient to successfully withstand the shearing stresses. This fact coupled with the fact that the vessel wall, the reinforcing member and, in cases where the weld is also used to join a tubular connector or the like to the vessel wall and the reinforcing member, the tubular connector, are always of appreciable thickness, presents a serious problem as the metal of the weld cannot contract in cooling without developing extreme stresses which usually cause its failure.

It has been proposed in Patent No. 1,787,580 to solve the problem by reducing the thickness of the tubular connector in the region of the weld so that the welding groove formed by the vessel wall, the reinforcing member, and the tubular connector has one wall thin enough to follow the contracting weld metal and thus prevent the setting up of extreme stresses in the weld metal. The proposal of the patent mentioned has a number of serious drawbacks which limit its application and make it more expensive than need be.

For instance the proposal of the patent above mentioned can be used only with vessels of a diameter large enough to allow the welding to be performed from the inside of the vessel. The machining and other work required to prepare the walls of the welding groove materially increase the cost of the weld. Also since the vessel wall must be perforated before the main weld is made, it is not possible to join a large number of closely spaced tubular connectors to the vessel wall, as when a stabilizing tower and the like is fabricated, without distortion of the vessel. Furthermore because the nozzle or tubular connector is put in place before the metal of the main weld is deposited, it is extremely difficult if not impossible to make a proper X-ray examination of the main weld. This is very important in view of the common requirement that all welds which affect the strength and safety of a pressure vessel be subected to an X-ray examination.

It is to be noted that the weld disclosed in the patent above mentioned is of a depth substantially equal to the combined thickness of the vessel wall and the reinforcing member. Thus, if the vessel is three inches thick, the depth of the weld would be about six inches. The cost of producing such a weld of the necessary strength and homogeneity is excessive and as a practical matter the production of a homogeneous weld of the depth mentioned is well nigh impossible.

It is an object of this invention to provide a method of electrically welding reinforcing members, and/or tubular connectors and the like, to curved or flat plates by means of which the developing of excessive stresses in the weld metal is eliminated and welds of excessive depth are not required. The method being such that a minimum of weld metal is employed and said weld metal is of greatest strength at the region through which the stresses are transmitted. Also the method of the invention is such that an X-ray examination of the main weld may be easily carried on.

The invention has for a further object a method of the character indicated by means of which the metal used to join the reinforcing member and/or tubular connector, and the like, to the plate may be deposited before or after perforation of the plate and from either side thereof.

The particular nature of the invention, as well as other objects and advantages thereof, will appear most clearly by reference to the following description taken together with the drawing, in which:

Fig. 1 is a part sectional plan view, taken on line 1—1 of Fig. 2, showing a tubular connector and reinforcing plate joined to the wall of a pressure vessel in accordance with this invention.

Fig. 2 is a part sectional end view taken on line 2—2 of Fig. 1,

Figs. 3, 4 and 5 are views similar to that of Fig. 2, but showing different forms of joints.

To carry out my invention, referring particularly to Figs. 1 and 2, the plate 10, which may form part of the wall of a pressure vessel and which may be flat or curved, is perforated in any suitable manner to provide a hole for the passage therethrough of the end of tubular connector 11. Tubular connector 11 may be of any shape suitable to the purpose to which it is put. A thin walled welding dam 12 shaped to fit on plate 10 adjacent the periphery of the hole mentioned, is then joined to plate 10 by means of a light weld 13. The reinforcing member 14 is then perforated to provide a hole therethrough similar in shape to the hole in plate 10 but of a size to provide, when positioned on plate 10 concentric with welding dam 12, a groove wide enough to accommodate the weld metal necessary to resist the shearing stresses transmitted from plate 10 to reinforcing member 14. Reinforcing member 14 is shaped, if required, to contact with the portion of plate 10 it overlies, so that when it is positioned on plate 10, it may be joined thereto by a peripheral weld 15.

In the welding groove formed by the inner side of reinforcing member 14, the top of plate 10 and the outer side of welding dam 12 is then deposited weld metal, by means of any suitable electric welding apparatus, until the groove is completely filled up. Since the depth of main weld 16 does not exceed the thickness of the reinforcing plate 14, the cost of joining plate 10 and reinforcing member 14 is much less than the cost of a similar joint in accordance with the prior practice.

After the metal of main weld 16 has cooled, main weld 16 may be subjected to X-ray examination. Tubular connector 11 is then put in place and joined to plate 10 and reinforcing member 14 by peripheral welds 17 and 18. Welds 17 and 18 are of such size as to successfully resist the stresses tending to move connector 11 relative to plate 10 and reinforcing member 14.

In certain cases, as for instance when a large number of connectors 11 are joined to a pressure vessel such as a stabilizer tower, etc., the above procedure may be modified and main welds 16 completed before perforating the vessel wall. It has been found that by this expedient distortion of the vessel is greatly reduced.

Because of various considerations it is sometimes desired to have the main weld 16 on the inner side of the vessel of which plate 10 may form part. In such cases, referring particularly to Fig. 3, plate 10 is perforated to form a hole of such size that when reinforcing member 14 and welding dam 12 are positioned, a welding groove will be formed of a width sufficient to accommodate the weld metal necessary to resist the shearing stresses transmitted from plate 10 to reinforcing member 14. After this is done, reinforcing member 14 is shaped, if necessary, to fit plate 10 and is perforated to accommodate connector 11. Reinforcing member 14 is then positioned on plate 10 and joined thereto by peripheral weld 15. Welding dam 12 is next positioned and joined to reinforcing plate 14 by weld 13 to complete the groove of main weld 16. The metal used to form main weld 16 is deposited as previously and when it has cooled may be subject to an X-ray examination, after which, connector 11 is positioned and joined to reinforcing member 14 and plate 10 by means of peripheral welds 17 and 18 as previously. If desired, welding dam 12 may be joined to reinforcing member 14 before member 14 is positioned and joined to plate 10.

It is sometimes found more desirable to form the reinforcing member as an integral part of the tubular connector. In such a case, referring particularly to Fig. 4, plate 10 is perforated to form a hole of the character mentioned in connection with Fig. 3. The combined tubular connector and reinforcing member 20 is then shaped, if required, and after having been positioned on plate 10 is joined thereto by peripheral weld 15. Welding dam 12 is then connected to member 20 by light weld 13 to complete the groove of main weld 16 and the metal of main weld 16 deposited as heretofore. If desired, welding dam 12 may be attached to member 20 before member 20 is positioned on plate 10.

Fig. 5 further illustrates the invention. In Fig. 5 the main weld 16 serves to connect both reinforcing member 14 and tubular connector 11 to plate 10. In this case plate 10 is perforated to provide a hole of the same size as the hole of tubular connector 11 and reinforcing plate 14 is perforated to provide a hole with sloping sides of such size so that when tubular connector 11 and reinforcing member 14 are positioned on plate 10, a groove having the necessary width is defined. Tubular connector 11 has its end tapered to provide a thin wall portion which corresponds to the welding dam 12 Figs. 2, 3 and 4. After this has been done, reinforcing member 14 is positioned on plate 10 and fastened thereto by peripheral weld 15. Tubular connector 11 is then positioned and fastened to plate 10 by means of light weld 13. The metal of main weld 16 is then deposited.

Plate 10 may be perforated as just stated or, if desired, may be perforated after main weld 16 is completed. It is to be noted that main weld 16 in this case is at least as strong and has every function of the main weld of the patent above referred to, and yet is not quite half as deep.

Plug welds 19, shown in Fig. 3, may be used as additional connecting means wherever necessary or desired.

While the invention has been disclosed in connection with a number of its applications it is to be understood that the invention is not limited thereto and that various changes may be made without departing from its principle, as defined in the appendent claims.

I claim:

1. The method of welding reinforcing members to perforated metal plates which comprises positioning the reinforcing member to overlie the plate in the region of the hole therein, positioning a thin walled welding dam relative to said plate and said reinforcing member adjacent the edge of the hole in said plate to define a welding groove between said plate member and said dam of a width sufficient to accommodate the metal necessary to withstand the stresses transmitted from said plate to said reinforcing member and of a depth not in excess of the thickness of the thicker of said plate and said reinforcing member, and filling said groove with fusing welding metal by means of an electric arc to unite said plate, said reinforcing member and said welding dam.

2. The method of welding reinforcing members to perforated metal plates which comprises, perforating the reinforcing member, positioning said reinforcing member on the plate with its hole concentric with the hole in said plate, positioning a thin-walled welding dam relative to said plate and said reinforcing member between the edge of the hole in said plate and the edge of the hole in said member to define a welding groove of a width sufficient to accommodate the metal necessary to withstand the stresses transmitted from said plate to said reinforcing member and of a depth not greater than the thickness of the thicker of said plate and said reinforcing member, and filling said welding groove with fusing metal by means of an electric arc.

3. The method of perforating plates and welding reinforcing members thereto, which comprises perforating the reinforcing member, positioning said reinforcing member on the plate with its hole concentric with the proposed hole in said plate, positioning a thin-walled welding dam on said plate adjacent the edge of the proposed hole therein to define a welding groove between the edge of the hole of said plate and the hole of said member of a width sufficient to withstand the stresses transmitted from said plate to said reinforcing member and of a depth equal to the thickness of said reinforcing member, filling said welding groove with fusing metal by means of an electric arc, and perforating said plate.

4. The method of perforating plates and welding reinforcing members thereto which comprises perforating the reinforcing members to form a hole of a size greater than the proposed hole in the plate, positioning said member on said plate with its hole concentric with the proposed hole of said plate, positioning a thin-walled welding dam on said plate adjacent to said proposed hole, the size of the hole in said member being such that the space between said dam and the wall of said hole is sufficient to accommodate the metal necessary to withstand the stresses transmitted from said plate to said member, filling the space between said dam and said member with fusing metal by means of an electric arc, and perforating said plate.

5. The method of welding tubular connectors such as a nozzle and the like, to metal plates which comprises perforating a reinforcing member to form a hole larger than the outside of the tubular connector, positioning said member on the plate with its hole concentric to the proposed position of said tubular connector, positioning a thin-walled welding dam on said plate adjacent to the proposed position of said tubular connector, the size of the hole in said member being such that the space between said dam and the wall of said hole is sufficient to accommodate the metal necessary to withstand the stresses transmitted from said plate to said member, filling up the space between said dam and said member with fusing metal by means of an electric arc, perforating said plate to form a hole of a size sufficient to allow passage of said tubular connector, and connecting said tubular member to said plate and said member with fusing metal by means of an electric arc.

6. The method of welding tubular connectors such as nozzles, and the like, to metal plates which comprises; perforating a reinforcing member and the plate to provide a hole in each of said member and said plate not less in size than the tubular connector; positioning said member on said plate with its hole concentric to the hole of said plate; positioning a thin-walled welding dam relative to said plate and said member, between the edge of the hole of said plate and the hole of said member whereby said plate, said member, and said dam define a welding groove of a width sufficient to accommodate the metal required to withstand the stresses transmitted from said plate to said member and of a depth not substantially in excess of the thicker of said plate and said member; filling said welding groove with fusing metal by means of an electric arc; positioning said tubular connector in said hole; and connecting said tubular connector to said plate and said member with fusing metal by means of an electric arc.

7. The method of forming a plurality of substantially aligned holes along the length of a vessel such as a stabilizer tower and the like, and of reinforcing the vessel wall by welding reinforcing members thereto, which comprises; positioning a thin walled welding dam on said wall around the proposed periphery of one of said proposed holes; perforating a reinforcing member to form a hole of such size that said dam, said wall and said member define a welding groove of a width sufficient to accommodate the metal required to withstand the stresses transmitted from the vessel to said member; filling said welding groove with fusing metal by means of an electric arc, repeating the above recited steps at the site of each proposed hole; and when the metal of each weld has cooled, perforating the vessel wall to form the desired holes.

8. The method of joining a plurality of tubular connectors, such as nozzles and the like, to the wall of a vessel, such as a stabilizer tower and the like, which comprises; positioning a thin-walled welding dam on said wall around the proposed periphery of one of the proposed holes required to allow passage of one of the tubular connectors through said wall; perforating a reinforcing member to form a hole of such size that said dam, said wall and said member define a welding groove of a width sufficient to withstand the stresses transmitted from the vessel to said member, filling said welding groove with fusing metal by means of an electric arc; repeating the above recited steps at the proposed site of each of said connectors; perforating said wall at the site of each of said connectors to form holes of a size sufficient to allow said connector to pass through said walls; positioning said connectors in said holes; and connecting said connectors to said wall and members with fusing metal by means of an electric arc.

ALEXANDER KIDD.